(12) United States Patent
Chavda et al.

(10) Patent No.: US 7,836,088 B2
(45) Date of Patent: Nov. 16, 2010

(54) RELATIONSHIP-BASED PROCESSING

(75) Inventors: Ankur Chavda, Seattle, WA (US);
Justin M. Maguire, Seattle, WA (US);
Mickey Monaghan, Issaquah, WA (US);
Lola Jacobsen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 11/553,135

(22) Filed: Oct. 26, 2006

(65) Prior Publication Data

US 2008/0104084 A1    May 1, 2008

(51) Int. Cl.
G06F 17/30    (2006.01)
(52) U.S. Cl. .................... 707/795; 707/E17.048
(58) Field of Classification Search .................. 707/100, 707/1, 795, E17.048
See application file for complete search history.

(56) References Cited

U.S. PATENT DOCUMENTS

| | | | |
|---|---|---|---|
| 6,519,629 B2 | 2/2003 | Harvey et al. | |
| 6,968,179 B1 | 11/2005 | De Vries | |
| 7,035,923 B1 | 4/2006 | Yoakum et al. | |
| 7,069,259 B2 | 6/2006 | Horvitz et al. | |
| 7,483,969 B2 | 1/2009 | Chavda et al. | |
| 2002/0021307 A1 | 2/2002 | Glenn et al. | |
| 2003/0187813 A1* | 10/2003 | Goldman et al. | 707/1 |
| 2004/0143633 A1 | 7/2004 | McCarty | |
| 2004/0153506 A1 | 8/2004 | Ito et al. | |
| 2004/0154022 A1 | 8/2004 | Boss et al. | |
| 2004/0158609 A1 | 8/2004 | Daniell et al. | |
| 2004/0250212 A1 | 12/2004 | Fish | |
| 2004/0254998 A1 | 12/2004 | Horvitz | |
| 2004/0267887 A1 | 12/2004 | Berger et al. | |
| 2005/0084082 A1 | 4/2005 | Horvitz et al. | |
| 2005/0170847 A1 | 8/2005 | Karlsson et al. | |
| 2005/0171832 A1 | 8/2005 | Hull et al. | |
| 2005/0171954 A1 | 8/2005 | Hull et al. | |
| 2005/0198031 A1 | 9/2005 | Pezaris et al. | |
| 2005/0210104 A1 | 9/2005 | Torvinen | |
| 2005/0218206 A1 | 10/2005 | Ohno et al. | |
| 2006/0015609 A1 | 1/2006 | Hagale et al. | |
| 2006/0031510 A1 | 2/2006 | Beck et al. | |
| 2006/0031772 A1 | 2/2006 | Valeski | |
| 2006/0036688 A1 | 2/2006 | McMahan et al. | |
| 2006/0048059 A1* | 3/2006 | Etkin | 715/745 |
| 2006/0099911 A1 | 5/2006 | Shibuya | |
| 2006/0190117 A1 | 8/2006 | Weczorek et al. | |

(Continued)

OTHER PUBLICATIONS

U.S. Appl. No. 11/539,848, Chavda et al.

(Continued)

Primary Examiner—James Trujillo
Assistant Examiner—Amresh Singh
(74) Attorney, Agent, or Firm—Perkins Coie LLP

(57) ABSTRACT

A relationship engine provides for the management of relationship information between entities. The relationship information indicates the level (or degree) of relationship between an entity and another entity or entities. The relationship engine allows applications to access the relationship information that is being managed by the relationship engine. For example, when an application needs to process an interaction between one entity and another entity, the application can query the relationship engine for the relationship between the entities. The application can then base its processing behavior at least in part on the relationship information obtained from the relationship engine.

20 Claims, 8 Drawing Sheets

U.S. PATENT DOCUMENTS

2007/0255683 A1    11/2007   Cox
2008/0086531 A1     4/2008   Chavda et al.

OTHER PUBLICATIONS

"Developing IM Applications and Bots for Business," Extending the value of instant messaging, an Akonix whitepaper, IM in Control, © 2006 Akonix Systems, Inc.

Day, M., Rosenberg, J. and H. Sugano, "A Model for Presence and Instant Messaging," Feb. 2000, Network Working Group, RFC: 2778, Informational, © The Internet Society 2000.

Eisenstadt, Marc, Jiri Komzak and Martin Dzbor, "Instant messaging+maps=powerful collaboration tools for distance learning," Proceedings of TelEduc03, Havana, Cuba, May 19-21, 2003.

Fisher, Danyel, "Social Networks for End Users," Aug. 2003, Survey Paper, University of California, Irvine, 19 pages.

Fogarty, James, Jennifer Lai and Jim Christensen, "Presence versus Availability: The Design and Evaluation of a Context-Aware Communication Client," International Journal of Human Computer Studies, 2004, vol. 61, Issue 3, pp. 299-317.

Jachner, J. et al., "Rich Presence: A New User Communications Experience," Technology White Paper, User-Centric Conferencing and Collaboration, Alcatel Telecommunications Review, 1st Quarter 2005, © Mar. 2005 Alcatel.

Nardi, Bonnie A., Steve Whittaker and Erin Bradner, "Interaction and Outeraction: Instant Messaging in Action," CSCW'00, Dec. 2-6, 2000, Philadelphia, PA, pp. 79-88, © 2000 ACM.

Rosenberg, J., "A Presence Event Package for the Session Initiation Protocol (SIP)," Aug. 2004, Network Working Group, RFC: 3856, Standards Track, © The Internet Society 2004.

Tang, John C. and Begole, James 'Bo', "Beyond Instant Messaging," QUEUE, Nov. 2003, pp. 29-37, © 2003 ACM.

Vogiazou, Yanna, "Wireless Presence and Instant Messaging," Nov. 2002, TSW 02-07, KMI Institute, The Open University, © JISC 2002, 21 pages.

* cited by examiner

RELATIONSHIP-BASED PROCESSING

BACKGROUND

Users of computing devices (e.g., laptops, cellular phones, and personal digital assistants) often need to communicate in real time. A common form of real-time communications is provided by instant messaging services. An instant messaging service allows participants at endpoints to send messages and have them received within a second or two by the other participants in a conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

When an initiating participant wants to start a real-time conversation, that participant needs to know whether the intended participants are available to respond in real time to a message. If not, then communication via conventional electronic mail, voice mail, or some other mechanism may be more appropriate. For example, if the computers of the intended participants are currently powered off, then a real-time conversation may not be possible. Moreover, if their computers are currently powered on, but the intended participants are away from their computers, a real-time conversation is also not possible. The initiating participant would like to know the availability of the intended participants so that an appropriate decision on the form of communication can be made.

Presence services provide this availability information. The availability status of an entity such as a computer system or a user associated with that computer system is referred to as "presence information." Presence information identifies the current "presence state" of the user. Users make their presence information available to a presence server so that other users can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computer in a meeting. In such a case, the presence state may indicate "online" and "in a meeting."

A presence service may provide a presence server for distributing presence information. A publishing user ("publisher") may run client software that provides their presence information to a presence server that then provides the presence information to subscribing users ("subscribers"). Thus, a presence server may use a subscriber/publisher model to provide the presence information for the users of the presence service. Whenever the presence information of a publishing user changes, the presence server is notified of the change by that user's client software and in turn notifies the subscribing users of the change. A subscribing user can then decide whether to initiate a real-time communication and the type to initiate based on the presence information of the intended participants. For example, if the presence information indicates that a publishing user is currently on a conference telephone call, then the subscribing user may decide to send an instant message, rather than place a telephone call, to the publishing user. RFC 2778, entitled "A Model for Presence and Instant Messaging," is a specification relating to presence information in instant messaging systems. RFC 3856, entitled "A Presence Event Package for the Session Initiation Protocol," is a specification relating to presence information using the Session Initiation Protocol ("SIP").

Current presence services support the publication of increasingly larger numbers of presence states by publishers. Current presence services also provide publishers increased control over how others, such as the subscribers, see their presence information, and how the presence servers interact with the subscribers. For example, publishers are able to control the publication of their presence information on a per subscriber basis. Unfortunately, the increasing numbers of options (e.g., supported presence states, increased control, etc.) that can be set for each of the subscribers result in increasing complexity that is daunting even to advanced users of the presence services.

SUMMARY

A method and system for facilitating relationship-based processing is provided. A relationship engine provides for the management of relationship information between entities. The relationship information indicates the level (or degree) of relationship between an entity and another entity or entities (e.g., information regarding the relationship between a user and a contact or contacts). The relationship engine allows applications to access the relationship information that is being managed by the relationship engine. For example, when an application needs to process an interaction between an entity and another entity, the application can query the relationship engine for the relationship between the entities. The application can then base its processing behavior at least in part on the relationship information obtained from the relationship engine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
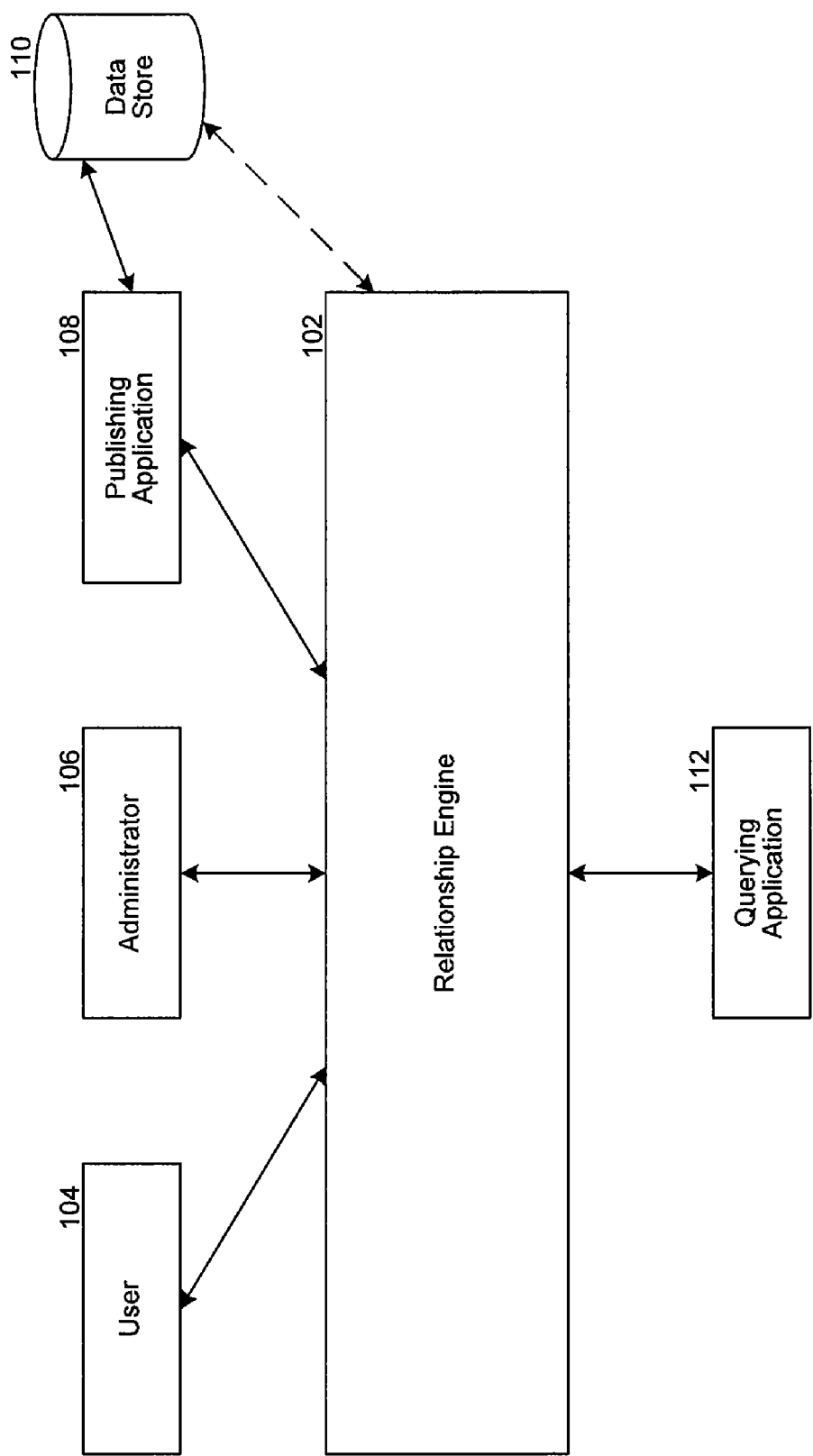
FIG. 1 is a block diagram that conceptually illustrates the processing of the relationship engine, according to some embodiments.

A method and system for facilitating relationship-based processing is provided. In some embodiments, a relationship engine provides for the management of relationship information between entities. The relationship information indicates the level (or degree) of relationship between an entity and another entity or entities (e.g., information regarding the relationship between a user and a contact or contacts). The relationship engine may provide an interface through which the level of relationship between an entity and another entity or entities can be specified. For example, the level of relationship may be indicated using terms such as "self," "family," "co-workers," "workers," "public," and "blocked" (i.e., no relationship). In this example, "family" may indicate a lower level of relationship than "self," but a higher level of relationship than "co-workers," "workers," "public," and "blocked." As another example, the level of relationship may be indicated using terms such as "high," "medium high," "medium," "medium low," "low," and "none." It will be appreciated that the actual terms that are used to specify the level of relationship is not as significant as the level of relationship that is represented by the various terms used to specify the relationship.

The relationship engine allows applications to access the relationship information that is being managed by the relationship engine. For example, when an application needs to process an interaction between a user and a contact, the application can query the relationship engine for the relationship between the user and the contact. The application can then base the processing of the interaction between the user and the contact on the relationship information obtained from the relationship engine. For example, an electronic mail (email) application may have received an email message sent by the contact and addressed to the user. Moreover, the email application may have allowed the user to specify how the user's incoming email messages are to be processed based on the user's relationship (i.e., the level of the user's relationship) to senders of the email messages. In order to properly process the email message, the email application queries the relationship engine for the relationship between the user and the contact. Stated differently, the email application queries the relationship engine for the relationship of the contact to the user. The email application can then further process the email message based on the indicated level of relationship obtained from the relationship store. For example, the user may have specified that email messages from senders whose level of relationship to the user is below "low" to be placed in the "deleted items" folder, that email messages from senders whose level of relationship to the user is between "low" and "medium high" to be placed in the "inbox" folder, and that email messages from senders whose level of relationship to the user is higher than "medium high" to be placed in the "inbox" folder and that the email application is to also provide the user a visual indication of the received email message. In this manner, the relationship engine allows an application to base its processing behavior at least in part on the relationship information obtained from the relationship engine.

In some embodiments, the relationship engine allows the relationship levels to be specified using a set of ordered or ranked relationship rules. Each relationship rule specifies a relationship level, and is analyzed to determine whether the relationship level corresponding to the particular relationship rule applies. For example, instead of specifying a relationship level for each contact, a user can specify a set of ordered relationship rules. When the relationship engine receives a query for the relationship between the user and a contact, the relationship engine can analyze the relationship rules in order (e.g., according to priority) until a relationship rule is satisfied. The relationship engine can then provide an indication of the level of relationship that corresponds to the relationship rule that is satisfied as a response to the query. For example, the user may have specified the following set of ordered relationship rules, from highest relationship level (relationship rule 1) to lowest relationship level (relationship rule 7):

1. contacts that are my immediate family
2. contacts that are in my department at work
3. contacts that are in my division at work
4. contacts that are family of my family
5. contacts who are in my proximity
6. contacts who reside in my zip code
7. others When the relationship engine receives a request for the relationship between the user and a contact, the relationship engine can analyze each relationship rule in order, starting from relationship rule 1, until a relationship rule is satisfied. Depending on the specified relationship rule, the relationship engine may analyze the particular relationship rule based on information from a variety of information sources, such as another application, database, etc. For example, to determine whether a contact is in the user's immediate family, the relationship engine may obtain information from a known information source that maintains the user's family information. Likewise, to determine whether a contact is in the user's department or division at work, the relationship engine may obtain information from an information source such as a database containing organization charts for the user's company. To determine whether a contact is family of the user's family, the relationship engine may obtain information from an information source such as a genealogy database. To determine whether a contact is in the user's proximity, the relationship engine may obtain information from an information source such as, a telecommunications application that maintains location information based on users' cellular phone usage, a global positioning application, and other applications that dynamically maintain location or position information. To determine whether a contact resides in the same zip code as the user, the relationship engine may obtain information from an information source such a telephone database. In the instance where none of the relationship rules are satisfied, the relationship engine can provide an indication that a relationship between the user and the contact cannot be determined. Alternatively, the relationship engine may provide an indication of a predetermined default relationship level.

In some embodiments, the relationship engine allows relationship information to be specified using a combination of the specific indications of the level of relationship and the relationship rules. For example, the level of relationship between a user and each of a specific number of contacts may be explicitly specified. The relationship levels between the user and the other contacts (i.e., the contacts other than the specific number of contacts whose relationship levels are explicitly specified) may be specified using a set of ordered relationship rules. When the relationship engine receives a request for the relationship between the user and a contact, the relationship engine can first check to determine if a level of relationship is specifically indicated for the particular contact and, if so, provide an indication of the level of relationship that is specifically indicated for the contact. Otherwise, if a level of relationship is not specifically indicated for the particular contact, the relationship engine can analyze the relationship rules in order and provide an indication of the level of relationship that corresponds to the relationship rule that is satisfied.

In some embodiments, the relationship engine may notify an entity before releasing relationship information regarding the entity. When the relationship engine receives a request for relationship information between an entity and another entity, the relationship engine may notify the entity of the request. The entity may then acknowledge the request indicating authorization or denial. If the entity acknowledges the request indicating authorization, the relationship engine provides an indication of the relationship between the entity and the specified other entity in response to the request. If the entity acknowledges the request indicating denial, the relationship engine does not provide an indication of the relationship between the entity and the specified other entity, but may provide an error indication in response to the request. In some embodiments, the relationship engine may wait for a predetermined timeout to receive the acknowledgement from an entity. If an acknowledgement denying the request is not received within the predetermined timeout, the relationship engine proceeds to provide an indication of the relationship between the entity and the specified other entity in response to the request. In this way, the entity can control which other entities are allowed to obtain relationship information regarding the entity. In some embodiments, the relationship engine may notify an entity upon releasing relationship information regarding the entity. In this way, the entity can maintain a record of the other entities who have obtained relationship information regarding the entity.

In some embodiments, the relationship engine allows entities to subscribe to receive notifications of changes to relationship information regarding another entity or entities. For example, a contact may subscribe to receive notifications whenever there is a change to a user's relationship information. In another example, an application may subscribe to receive notifications whenever there is a change to any of its users' (i.e., the users of the application) relationship information. When a change in the user's relationship information occurs, the relationship engine can notify the subscribers who have requested to be informed of changes to the user's relationship information that a change occurred in the user's relationship information.

FIG. 1 is a block diagram that conceptually illustrates the processing of the relationship engine, according to some embodiments. The relationship engine 102 facilitates relationship-based processing by managing information regarding relationships between users and contacts. A user 104 may access the relationship engine through a provided interface and provide an indication of or update his or her relationship to one or more contacts. An administrator 106 may also access the relationship engine and provide or update the relationship information for a user or users. A publishing application 108 may also interact with the relationship engine through a provided application program interface (not shown) to provide or update relationship information for a user or users. For example, a corporate data store 110, such as, by way of example, ACTIVE DIRECTORY, may contain a user's current corporate organizational data. When a change to the user's organizational data occurs, the publishing application can appropriately update the user's relationship information managed by the relationship engine. When a change to the user's organizational data occurs, the data store may directly update a user's relationship information managed by the relationship engine, as indicated by the dashed line. A querying application 112, which may be a third-party application, can then query the relationship engine for the relationship between a user and a contact, and base its processing on the obtained relationship information. In some embodiments, the relationship engine may directly query the data store. For example, when the querying application queries the relationship engine for the relationship between a user and a contact, the relationship engine can query the data store to obtain the current organizational state of the user and the contact, and provide the relationship between the user and the contact based on the organizational state.

The relationship engine may be implemented as part of an application, such as, by way of example, a conferencing application, a communication application, etc., and the application can query the relationship engine for the relationship between a user and a contact. In another example, the relationship engine may be implemented as a component of a system that includes an application or applications that query the relationship engine for the relationship information. In still another example, the relationship engine may be implemented as a stand-alone application that provides an interface through which remote applications can interact and query the relationship engine for the relationship information.

Figure 2:
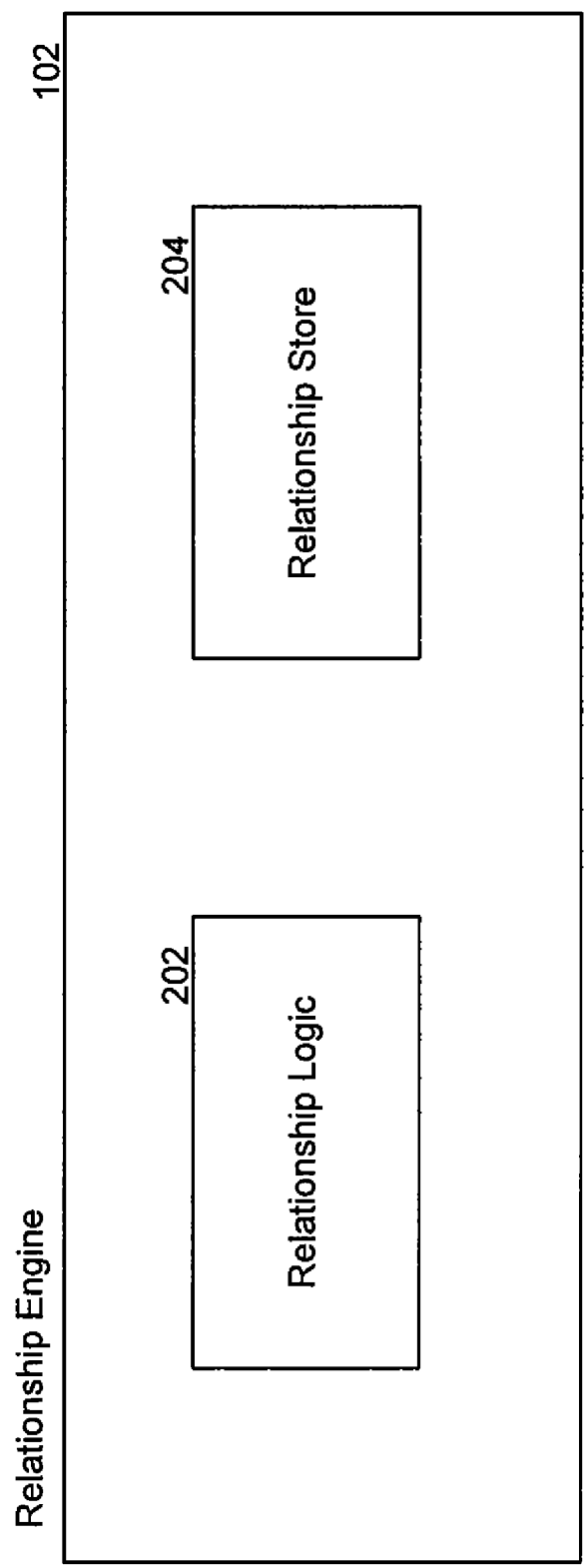
FIG. 2 is a block diagram that illustrates selected components of the relationship engine, according to some embodiments.

FIG. 2 is a block diagram that illustrates selected components of the relationship engine, according to some embodiments. The relationship engine comprises a relationship logic component 202 and a relationship store 204. The relationship store contains the relationship information that is being managed by the relationship engine. The relationship store may also contain the relationship rules. The relationship logic component processes the received queries for relationship information. The relationship logic also provides notifications of received requests for relationship information, processes acknowledgements, provides notifications of releases of relationship information, and notifies subscribers of changes to relationship information. The aforementioned components of the relationship engine are only illustrative and are not intended to suggest any limitation as to the implementation of the illustrated components and/or the scope of use or functionality of the relationship engine. For example, although not shown in FIG. 2, the relationship engine includes components that allow users and applications to provide relationship information for management by the relationship engine.

The computing device on which the relationship engine is implemented may include a central processing unit, memory, input devices (e.g., keyboard and pointing devices), output devices (e.g., display devices), and storage devices (e.g., disk drives). The memory and storage devices are computer-readable media that may contain computer executable instructions that implement the relationship engine. As used herein, "computer-readable media encoded with computer executable instructions" means computer-readable media comprising computer executable instructions. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the relationship engine, including the client replication component and the server replication component may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on.

The computer systems may be cell phones, personal digital assistants, smart phones, personal computers, programmable consumer electronics, digital cameras, and so on.

The relationship engine may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
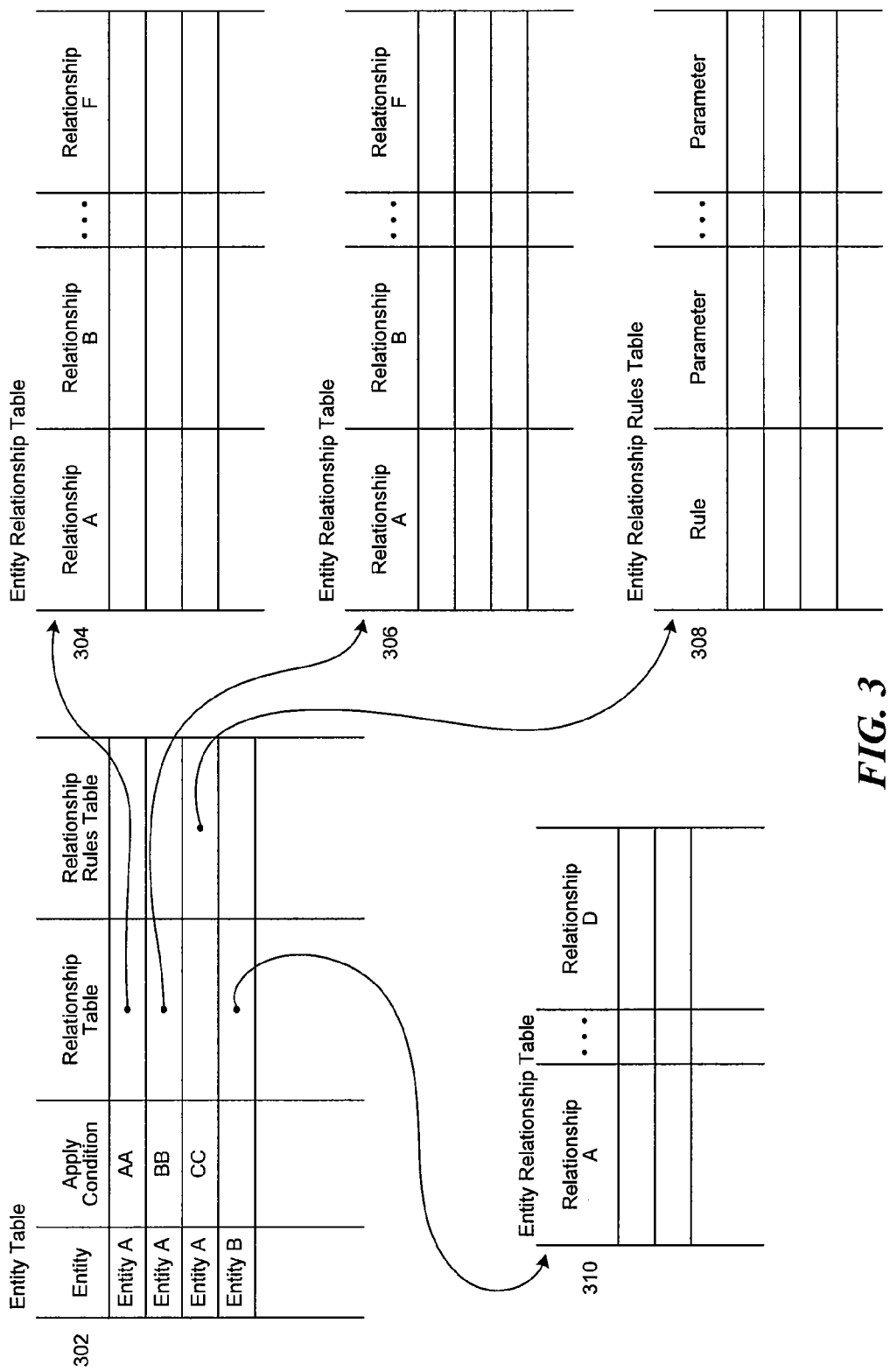
FIG. 3 is a data structure diagram that illustrates example logical data structures of the relationship engine, according to some embodiments.

FIG. 3 is a data structure diagram that illustrates example logical data structures of the relationship engine, according to some embodiments. The data structure includes an entity table 302 that includes an entry for each entity, such as a user. Each entry may specify an optional apply condition, and may point to an entity relationship table and/or an entity relationship rules table. The entity table contains the relationships which were specifically indicated. The entity relationship table contains a column for each type of relationship (e.g., indicated in FIG. 3 as Relationships A-F). Each column (or relationship type) contains an entry for the entity (e.g., contact) whose relationship to the entity identified in the entity table is of the particular relationship type. For example, each entry under Relationship A in entity relationship table 304 identifies a contact whose relationship to Entity A is of type Relationship A. The entity relationship rules table contains an entry for each relationship rule of the corresponding entity and, for each relationship rule, any parameters necessary to analyze the particular relationship rule. For example, a parameter or parameters for a relationship rule may specify information regarding accessing an information source from which information is to be obtained in order to properly analyze the particular relationship rule. The apply condition, if specified, indicates a condition under which the relationships specified in the corresponding entity relationship table and/or the relationship rules specified in the corresponding entity relationship rules table apply. Specifying an apply condition facilitates the use or application of different relationship information and/or relationship rules for an entity based on the specified apply condition. For example, a user may specify multiple sets of relationship information and, for each set of relationship information, further specify a condition or conditions, such as a time period, in which the particular set of relationship information is applicable. Another example of an apply condition is the user's presence information. For example, the user may specify different sets of relationship information that are to be applied based on the user's current presence state (e.g., in a meeting, do-not-disturb, available, etc.). In this instance, the user may specify a presence service from which the relationship engine may obtain an indication of the user's current presence or sufficient information to determine the user's current presence.

As illustrated by example in FIG. 3, there are three entries for Entity A and one entry for Entity B in the entity table. The first entry for Entity A specifies a corresponding apply condition AA, the second entry for Entity A specifies a corresponding apply condition BB, and the third entry for Entity A specifies a corresponding apply condition CC. Thus, if the specified apply condition AA is satisfied, then the relationship information for Entity A is to be retrieved from entity relationship table 304. If the specified apply condition BB is satisfied, then the relationship information for Entity A is to be retrieved from entity relationship table 306. If the specified apply condition CC is satisfied, then the relationship information for Entity A is to be determined from the relationship rules in entity relationship rules table 308. The entry for Entity B does not specify an apply condition, thus, the relationship information for Entity B is to be retrieved from entity relationship table 310. Although some entity relationship tables illustrated in FIG. 3 indicate the same relationship types, one skilled in the art will appreciate that the entity relationship tables may contain different number and/or types of relationships. Moreover, although not illustrated in FIG. 3, an entry for an entity may point to both an entity relationship table and an entity relationship rules table. For example, an entity may have specified the relationship information using a combination of specific indications of levels of relationships (which are maintained in the entity relationship table) and relationship rules (which are maintained in the entity relationship rules table). One skilled in the art will also appreciate that this is only one example of the logical layout of data structures of the relationship engine. The data structures of the relationship engine may be tailored to the space/computation requirements of the relationship engine, or the application or system containing the relationship engine.

Figure 4:
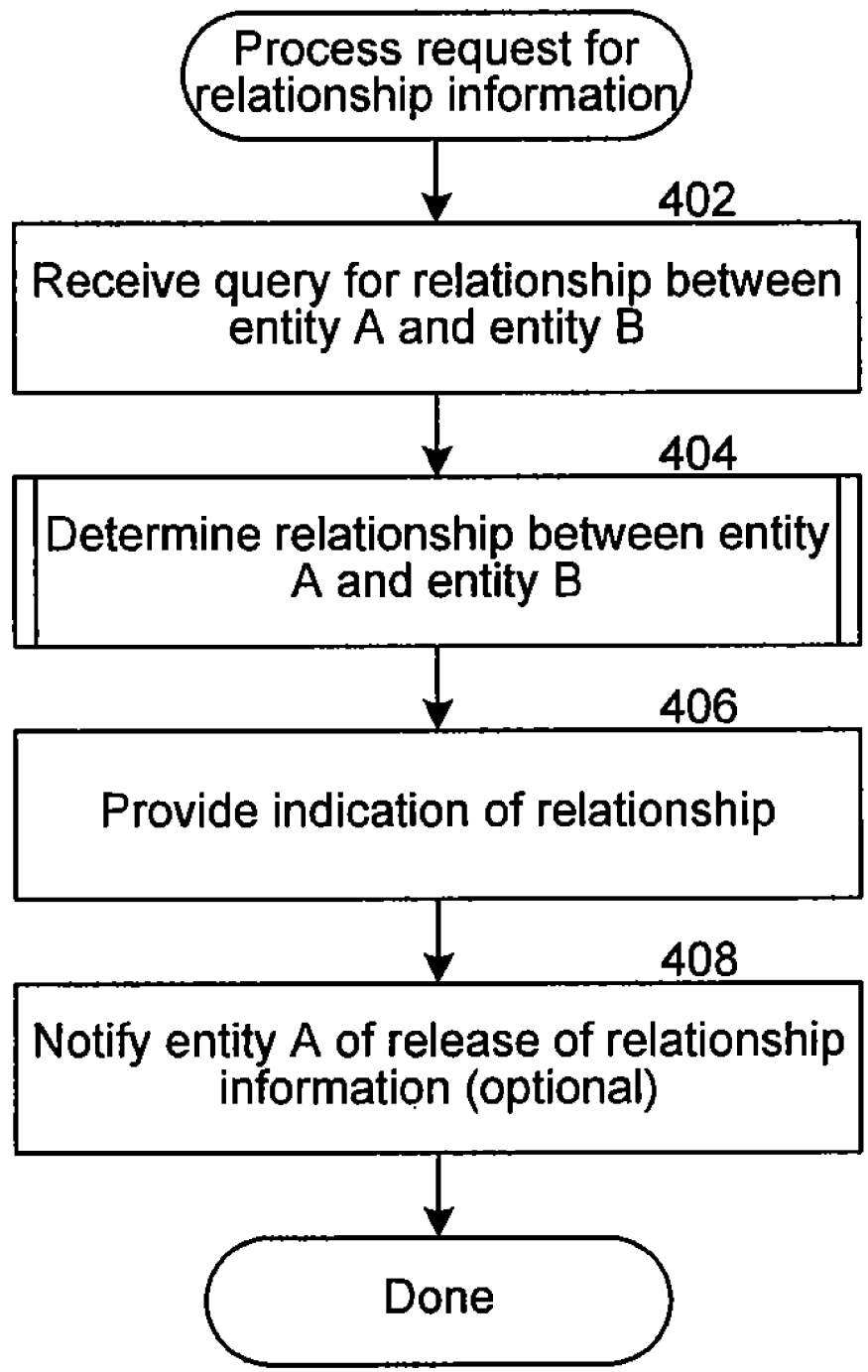
FIG. 4 is a flow diagram that illustrates the processing of the relationship logic component of the relationship engine, according to some embodiments.

FIG. 4 is a flow diagram that illustrates the processing of the relationship logic component of the relationship engine, according to some embodiments. In block 402, the relationship logic component receives a query for the relationship between entity A and entity B. In block 404, the relationship logic component determines the relationship between entity A and entity B. In block 406, the relationship logic component provides an indication of the relationship between entity A and entity B in response to the received query. If a relationship between entity A and entity B is not specified, then the relationship logic component may provide an indication that there is no relationship between entity A and entity B in response to the received query. In block 408, the relationship logic component optionally notifies entity A of the release of the relationship information regarding entity A and entity B, and completes. In some embodiments, the relationship logic component may provide the relationship information upon verifying the credentials of the requester. In some embodiments, the relationship logic component may notify entity A and entity B of the release of the relationship information regarding entity A and entity B.

One skilled in the art will appreciate that, for this and other processes and methods disclosed herein, the functions/steps performed in the processes and methods may be altered in various ways. For example, the order of the outlined steps is only exemplary, and the steps may be rearranged, some of the steps may be optional, substeps may be performed in parallel, some of the steps may be combined into fewer steps or expanded into additional steps, other steps may be included, etc.

Figure 5:
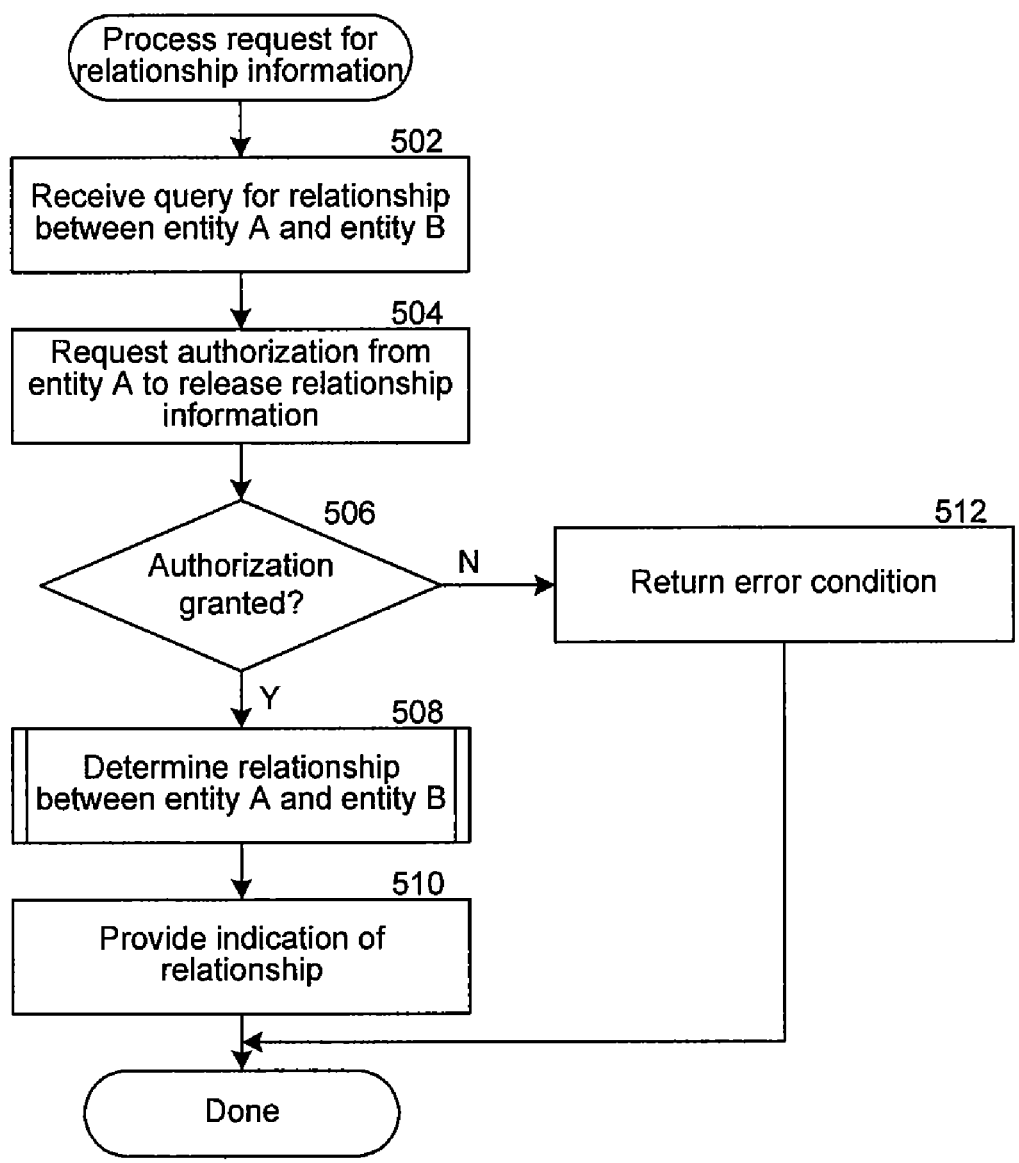
FIG. 5 is a flow diagram that illustrates the processing of the relationship logic component of the relationship engine, according to other embodiments.

FIG. 5 is a flow diagram that illustrates the processing of the relationship logic component of the relationship engine, according to other embodiments. In block 502, the relationship logic component receives a query for the relationship between entity A and entity B. In block 504, the relationship logic component requests authorization from entity A to release the relationship information regarding entity A and entity B. Entity A may have previously indicated the manner in which the relationship engine is to request authorization from entity A. In decision block 506, of the authorization is granted, then the relationship logic component continues at block 508, else the relationship logic component continues at block 512. In block 508, the relationship logic component determines the relationship between entity A and entity B. In block 510, the relationship logic component provides an indication of the relationship between entity A and entity B in response to the received query, and completes. If a relationship between entity A and entity B is not specified, then the relationship logic component may provide an indication that there is no relationship between entity A and entity B in response to the received query. In block 512, the relationship logic component returns an error condition indicating the denial of authorization to release the requested relationship information, and completes. In some embodiments, the relationship logic component may request authorization from both entity A and entity B prior to releasing the relationship information regarding entity A and entity B.

Figure 6:
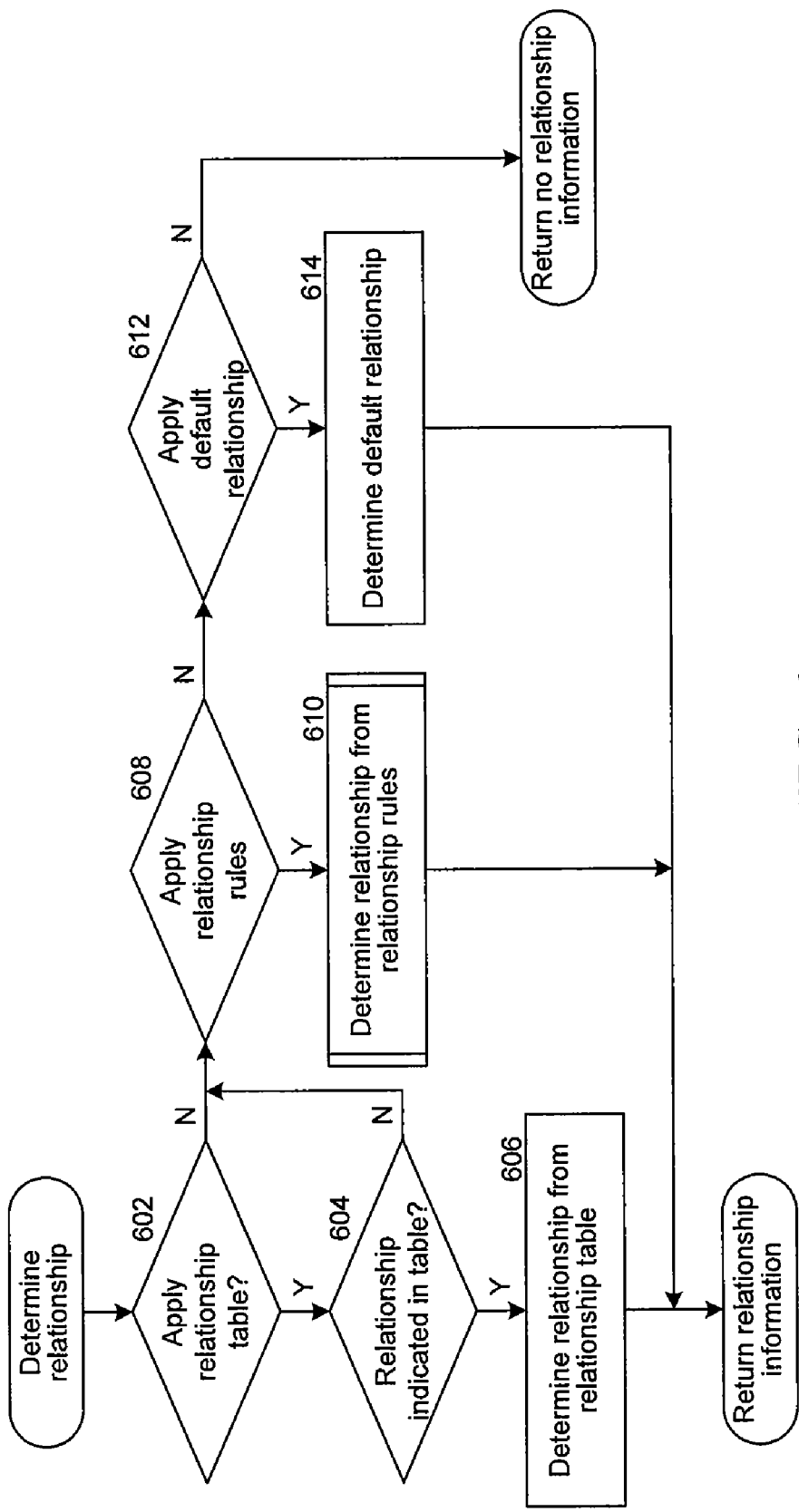
FIG. 6 is a flow diagram that illustrates the processing of the relationship logic component of the relationship engine in determining a relationship, according to some embodiments.

FIG. 6 is a flow diagram that illustrates the processing of the relationship logic component of the relationship engine in determining a relationship, according to some embodiments. The relationship logic component attempts to determine the relationship information from an applicable relationship table (i.e., the provided specific indications of relationships) and, if unsuccessful, attempts to determine the relationship information by analyzing applicable relationship rules. In decision block 602, if a relationship table is to be applied (e.g., entity A provided specific indications of his or her relationships to others, and also indicated that the provided specific indications of relationships are to be applied under the present conditions (e.g., time, current presence, etc.)), then the relationship logic component continues at decision block 604, else the relationship logic component continues at decision block 608 (e.g., entity A may have only specified relationship rules for use in determining his or her relationship information). In decision block 604, if the requested relationship is indicated in the relationship table, then the relationship logic component continues at block 606, else the relationship logic component continues at decision block 608. In block 606, the relationship logic component determines the relationship between entity A and entity B from the relationship table, and returns the relationship information. In decision block 608, if provided relationship rules are to be applied (e.g., entity A provided relationship rules for use in determining his or her relationships to others, and also indicated that the provided relationship rules are to be applied under the present conditions), then the relationship logic component continues at block 610, else the relationship logic component continues at decision block 612. In block 610, the relationship logic component determines the relationship between entity A and entity B by analyzing the relationship rules, and returns the relationship information. In decision block 612, if a default relationship rules applies, then the relationship logic component continues at block 614, else the relationship logic component returns no relationship information. For example, the relationship logic component may return an indication that a relationship between entity A and entity B does not exist or cannot be determined. In block 614, the relationship logic component determines the default relationship between entity A and entity B, and returns the relationship information. For example, the default relationship may be a "catch-all" relationship that applies when a more specific relationship is not provided.

Figure 7:
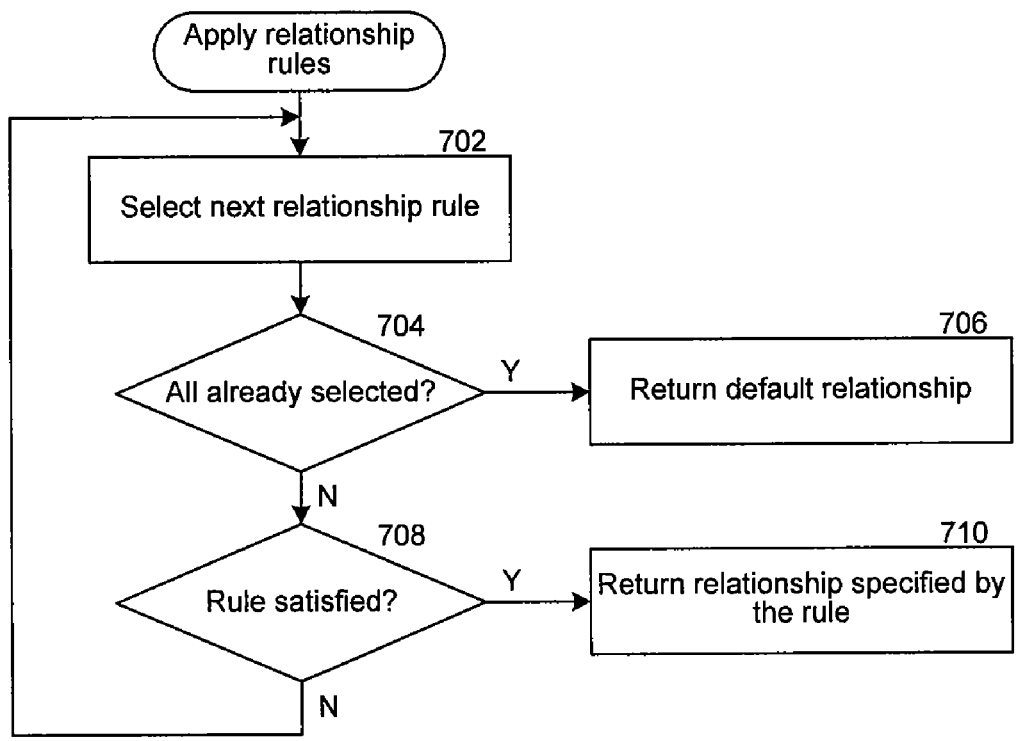
FIG. 7 is a flow diagram that illustrates the processing of the relationship logic component of the relationship engine in applying relationship rules, according to some embodiments.

FIG. 7 is a flow diagram that illustrates the processing of the relationship logic component of the relationship engine in applying relationship rules, according to some embodiments. In block 702, the relationship logic component selects the next relationship rule to apply. In decision block 704, if all the relationship rules have already been selected, then the relationship logic component continues at block 706, else the relationship logic component continues at decision block 708. In block 706, the relationship logic component returns an indication of a default relationship, and completes. The indication of the default relationship may be an indication that a relationship does not exist or an indication of a "catch-all" relationship. In decision block 708, if the relationship rule is satisfied, then the relationship logic component continues at block 710, else the relationship logic component loops to block 702 to select the next relationship rule to apply. In block 710, the relationship logic component returns an indication of the relationship specified by the relationship rule, and completes.

Figure 8:
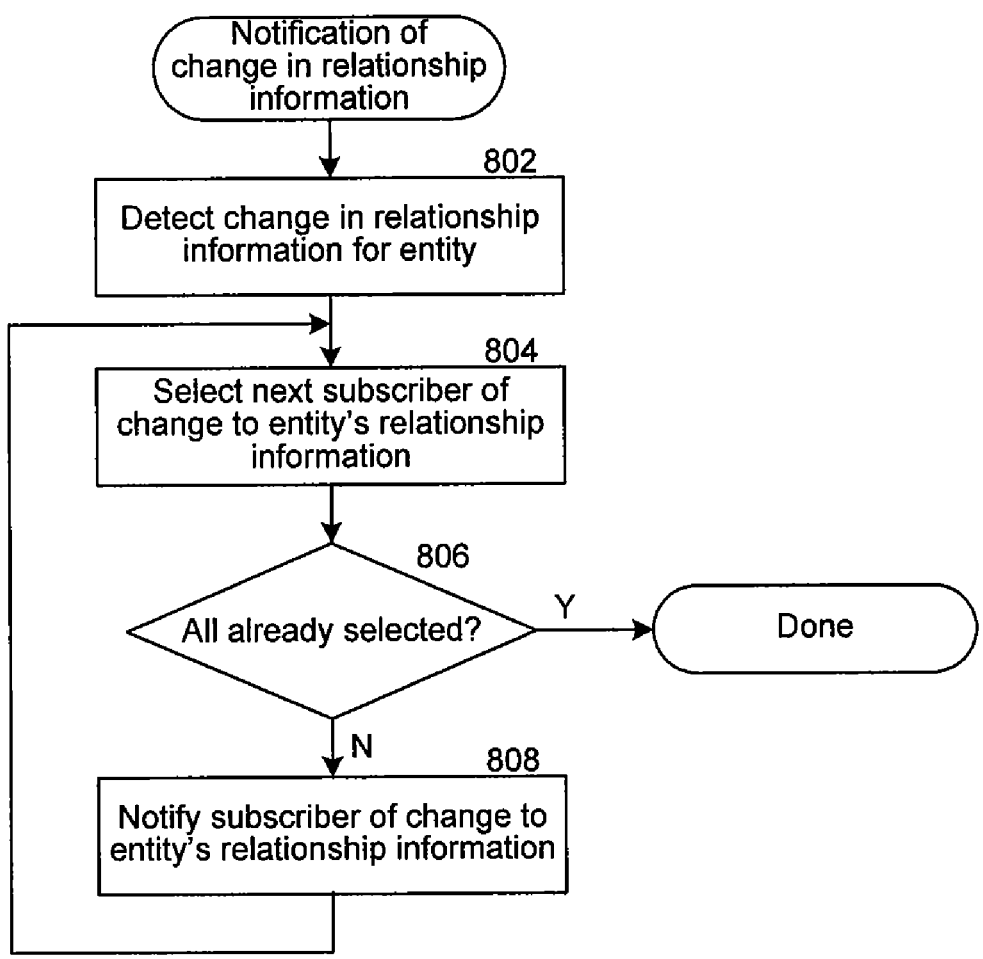
FIG. 8 is a block diagram that illustrates the processing of the relationship logic component of the relationship engine in notifying subscribers of a change to relationship information, according to some embodiments.

FIG. 8 is a block diagram that illustrates the processing of the relationship logic component of the relationship engine in notifying subscribers of a change to relationship information, according to some embodiments. The relationship engine may allow subscribers to subscribe to receive notifications of changes to an entity's relationship information. In block 802, the relationship logic component detects a change in the relationship information for an entity. In block 804, the relationship logic component selects the next subscriber to receive notification of the change to the entity's relationship information. In decision block 806, if all of the subscribers have been selected, then the relationship logic component completes, else the relationship logic component continues at block 808. In block 808, the relationship logic component notifies the subscriber of the change to the entity's relationship information. The relationship logic component then loops to block 804 to select the next subscriber.

From the foregoing, it will be appreciated that specific embodiments of the relationship engine have been described herein for purposes of illustration, but that various modifications may be made without deviating from the spirit and scope of the invention. Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. Computer-readable storage media encoded with computer executable instructions for providing relationship-based processing, by a method comprising:

receiving from a first application a request for an indication of a relationship between a first entity and a second entity, wherein the relationship between the first entity and the second entity is not known to the first application at the time the request for the indication of the relationship between the first entity and the second entity is received;

in response to receiving the request for an indication of a relationship between the first entity and the second entity, determining the relationship between the first entity and the second entity based on a plurality of ordered relationship rules, each relationship rule specifying a relationship and having an associated priority from high to low, by analyzing the plurality of ordered relationship rules, in priority order from high priority to low priority, until a relationship rule is satisfied so that after one relationship rule is satisfied, no additional lower priority relationship rules are analyzed in the determining of the relationship between the first entity and the second entity;

sending to the first application an indication of the determined relationship between the first entity and the second entity, as determined by analyzing the ordered relationship rules;

receiving from a second application a request for an indication of a relationship between a third entity and a fourth entity, at least one of the third and fourth entities being different from both the first and second entities, wherein the relationship between the third entity and the fourth entity is not known to the second application at the time the request for the indication of the relationship between the third entity and the fourth entity is received;

in response to receiving the request for an indication of a relationship between the third entity and the fourth entity, determining the relationship between the third entity and the fourth entity based on the plurality of ordered relationship rules by analyzing the plurality of ordered relationship rules, in order from high priority to low priority, until a relationship rule is satisfied so that after one relationship rule is satisfied, no additional lower priority relationship rules are analyzed in the determining of the relationship between the third entity and the fourth entity, the relationship between the third and fourth entities being different from the relationship between the first and second entities; and sending to the second application an indication of the determined relationship between the third entity and the fourth entity, as determined by analyzing the ordered relationship rules, such that the first application bases its processing behaviors at least in part on the sent indication of the determined relationship between the first entity and the second entity and such that the second application bases its processing behaviors at least in part on the sent indication of the determined relationship between the third entity and the fourth entity.

2. The computer-readable storage media of claim 1, wherein the processing behaviors of the first application determine information regarding the first entity that is made available to the second entity.

3. The computer-readable storage media of claim 1, wherein the processing behaviors of the first application determine the level of interaction between the first entity and the second entity.

4. The computer-readable storage media of claim 1 including sending a notification to the first entity of the sending of the indication of the relationship between the first entity and the second entity.

5. The computer-readable storage media of claim 1 including:
  requesting authorization from the first entity to send the indication of the relationship between the first entity and the second entity to the first application; and
  upon receiving the authorization from the first entity, sending the indication of the relationship between the first entity and the second entity to the first application.

6. The computer-readable storage media of claim 1 including:
  detecting a change in the relationship information for the first entity; and
  notifying a subscriber of the change in the relationship information for the first entity.

7. The computer-readable storage media of claim 1, wherein the relationship between the first entity and the second entity varies based on time.

8. The computer-readable storage media of claim 1, wherein the relationship between the first entity and the second entity varies based on the first entity's current presence.

9. A computer-implemented method performed by a computer having a memory and a processor for providing relationship-based processing, the method comprising:
  receiving, from each of a plurality of applications, a request for an indication of a relationship between two entities, each request made by an application upon detecting a need to process an interaction between the two entities, wherein the relationship between the two entities is not known to the application at the time the request for the indication of the relationship between the two entities is received; and
  for each request for an indication of a relationship between two entities that is received from the plurality of applications,
    with a processor, sending a request to at least one of the entities for authorization to release relationship information between the two entities, and
    in response to receiving from the at least one of the two entities authorization to release relationship information between the two entities,
      with a processor, determining the relationship between the two entities at least in part by,
        accessing a plurality of ordered relationship rules, each relationship rule specifying a relationship and having an associated priority, and
        analyzing the plurality of ordered relationship rules, in priority order from high priority to low priority, until a relationship rule is satisfied so that after one relationship rule is satisfied, no additional lower priority relationship rules are analyzed in the determining of the relationship between the two entities, and
    sending to the application that requested the indication an indication of the relationship specified by the satisfied relationship rule indicating the relationship between the two entities based on the analysis of the ordered relationship rules, such that a requesting application bases its processing of the interaction between the two entities at least in part on the indication of the relationship between the two entities.

10. The computer-implemented method of claim 9, wherein one of the plurality of rules determines the relationship between the entities based on the proximity of the entities.

11. The computer-implemented method of claim 9, wherein one of the plurality of rules determines the relationship between the entities based on an employment relationship between the entities.

12. The computer-implemented method of claim 9, wherein one of the plurality of rules determines the relationship between the entities based on a familial relationship between the entities.

13. The computer-implemented method of claim 9, further comprising:
  in response to receiving from the at least one of the entities a denial of authorization to release relationship information between the two entities, with a processor, returning an error condition.

14. A system having a memory and a processor for providing relationship-based processing, comprising:
  a component that receives from a first user a first plurality of ordered relationship rules and that receives from a second user a second plurality of ordered relationship rules different from the first plurality of ordered relationship rules; and
  a relationship engine that,
    receives from an application a first request for a relationship between the first entity and the first user, determines the relationship between the first entity and the first user at least in part by analyzing the first plurality of ordered relationship rules from high priority to low priority until a relationship rule is satisfied so that after one relationship rule is satisfied, no additional lower priority relationship rules are analyzed in the determining of the relationship between the first entity and the first user, sends an indication of the relationship between the first entity and the first user to the application, the indication of the relationship between the first entity and the first user including the identification of the relationship between the first entity and the first user and receives from the application a second request for a relationship between the first entity and the second user, determines the relationship between the first entity and the second user at least in part by analyzing the second plurality of ordered relationship rules from high priority to low priority until a relationship rule is satisfied so that after one relationship rule is satisfied, no additional lower priority relationship rules are analyzed in the determining of the relationship between the first entity and the second user, and sends an indication of the relationship between the first entity and the second user to the application, the indication of the relationship between the first entity and the second user including the identification of the relationship between the first entity and the second user, wherein the application is stored as instructions in the memory for execution by the processor.

15. The system of claim 14, wherein the relationship engine further notifies the first entity of the sending of the indication of the relationship between the first entity and the first user.

16. The system of claim 14, wherein the relationship engine further requests authorization from the first entity to send the indication of the relationship between the first entity and the first user to the application, and sends the indication of the relationship between the first entity and the first user to the application upon receiving authorization from the first entity.

17. The system of claim 14, wherein the application processes the interaction between the first entity and the first user based on the indication of the relationship between the first entity and the first user.

18. The system of claim 14, wherein the relationship between the first entity and the first user is determined from a plurality of relationship rules.

19. The system of claim 18, wherein the plurality of relationship rules are ranked according to priority.

20. The system of claim 19, wherein the plurality of relationship rules are applied in sequence according to their ranking to determine the relationship between the first entity and the first user.

* * * * *